United States Patent
Park et al.

(10) Patent No.: US 10,975,758 B2
(45) Date of Patent: Apr. 13, 2021

(54) VEHICLE HAVING AN INTEGRATED COOLANT CONTROL VALVE AND A CONTROL METHOD FOR SAME

(71) Applicants: HYUNDAI MOTOR COMPANY, Seoul (KR); KIA MOTORS CORPORATION, Seoul (KR)

(72) Inventors: Seong Kyu Park, Hwaseong-si (KR); Jungsup Byun, Seongnam-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 312 days.

(21) Appl. No.: 16/189,599

(22) Filed: Nov. 13, 2018

(65) Prior Publication Data
US 2020/0025059 A1 Jan. 23, 2020

(30) Foreign Application Priority Data
Jul. 19, 2018 (KR) .................. 10-2018-0083808

(51) Int. Cl.
| F01P 11/14 | (2006.01) |
| F01P 7/16 | (2006.01) |
| B60H 1/00 | (2006.01) |
| F01P 7/14 | (2006.01) |

(52) U.S. Cl.
CPC .......... *F01P 11/14* (2013.01); *B60H 1/00885* (2013.01); *F01P 7/16* (2013.01); *F01P 2007/146* (2013.01); *F01P 2025/34* (2013.01); *F01P 2025/40* (2013.01); *F01P 2025/42* (2013.01); *F01P 2025/66* (2013.01)

(58) Field of Classification Search
CPC .... F01P 11/16; F01P 7/16; F01P 7/165; F01P 7/14; F01P 2025/66; F01P 2025/40; F01P 2025/42; F01P 2025/34; F01P 2025/32; F01P 2031/20; F01P 2031/34; F01P 2007/146; F02B 77/00; F02B 77/08; F01L 9/40; F01L 2009/4088; B60W 1/00885
See application file for complete search history.

(56) References Cited

U.S. PATENT DOCUMENTS

| 6,679,202 | B2 * | 1/2004 | Nakano | ..................... | F01P 5/14 123/41.1 |
| 9,964,018 | B2 * | 5/2018 | Kaneko | ..................... | F01P 3/20 |
| 10,072,556 | B2 * | 9/2018 | Maruyama | .......... | F16K 11/0873 |

(Continued)

*Primary Examiner* — Grant Moubry
*Assistant Examiner* — James G Moubry
(74) *Attorney, Agent, or Firm* — Lempia Summerfield Katz LLC (57) ABSTRACT

A control method for a vehicle, provided with an integrated coolant control valve, includes; performing, by a controller, a fault diagnosis of the integrated coolant control valve; determining, by the controller, whether a position sensor is faulty, the position sensor measuring a position of a cam and outputting a corresponding position output when the controller determines that the integrated coolant control valve is faulty; moving the cam for opening and closing a plurality of valves to a maximum position by operating the integrated coolant control valve when the controller determines that the position sensor is faulty; stopping the operation of the integrated coolant control valve by the controller; and limiting a torque output of an engine by the control of the controller according to the position of the cam.

8 Claims, 5 Drawing Sheets

(56) References Cited

U.S. PATENT DOCUMENTS

| | | | |
|---|---|---|---|
| 10,513,968 B2* | 12/2019 | Yumisashi | ................ F01P 7/16 |
| 2013/0160723 A1* | 6/2013 | Miyagawa | ................ F01P 7/16 |
| | | | 123/41.1 |
| 2014/0110081 A1* | 4/2014 | Porras | ..................... F01P 11/04 |
| | | | 165/11.1 |
| 2019/0186337 A1* | 6/2019 | Insixiengmai | ............ F01P 3/20 |

\* cited by examiner

VEHICLE HAVING AN INTEGRATED COOLANT CONTROL VALVE AND A CONTROL METHOD FOR SAME

CROSS-REFERENCE TO RELATED APPLICATION

This application claims priority to and the benefit of Korean Patent Application No. 10-2018-0083808 filed in the Korean Intellectual Property Office on Jul. 19, 2018, the entire contents of which are incorporated herein by reference.

BACKGROUND

(a) Field of the Disclosure

The present disclosure relates to a vehicle provided with an integrated coolant control valve and a control method for the same. The disclosed integrated coolant control valve and method may protect the engine in case of malfunction/failure of the integrated coolant control valve.

(b) Description of the Related Art

An engine discharges thermal energy while generating torque based on combustion of fuel. Engine coolant absorbs thermal energy while circulating through an engine, a heater, and a radiator, and releases the thermal energy to the outside.

When a temperature of the coolant of the engine is low, viscosity of oil may increase to increase frictional force and fuel consumption. A temperature of an exhaust gas may increase gradually to lengthen a time for a catalyst to be activated, which degrades quality of the exhaust gas. In addition, as the time required for a function of the heater to be normalized is increased, a driver may feel discomfort.

When the coolant temperature is excessively high, knocking may occur and performance of the engine may deteriorate by adjusting ignition timing in order to suppress the knocking. In addition, when the temperature of lubricant is excessively high, viscosity is lowered such that lubrication performance may be deteriorated.

Development is ongoing of a cooling system such as an integrated coolant control valve (or an integrated thermal management valve or an integrated thermal management system) as a configuration for supplying cooling water of engines and other heat exchange elements.

However, there is a risk that the engine may be damaged due to engine overheating if the cooling system does not properly respond to the failure.

The above information disclosed in this Background section is only to enhance understanding of the background of the disclosure. Therefore, the Background may contain information that does not form the prior art that is already known in this country to a person of ordinary skill in the art.

SUMMARY

The present disclosure is made in an effort to provide a vehicle that includes an integrated coolant control valve and a control method for the same having advantages of protecting the engine in case of malfunction/failure of the integrated coolant control valve.

A control method according to an embodiment of the present disclosure may be applied to a vehicle provided with an integrated coolant control valve. The control method may include: performing, by a controller, a fault diagnosis of the integrated coolant control valve; determining, by the controller, whether a position sensor is faulty, the position sensor measuring a position of a cam and outputting a corresponding output signal when the controller determines that the integrated coolant control valve is faulty; moving the cam for opening and closing a plurality of valves to a maximum position by operating the integrated coolant control valve when the controller determines that the position sensor is faulty; stopping the operation of the integrated coolant control valve by the controller and limiting a torque output of an engine by the control of the controller according to the measured position of the cam.

The maximum position may be a position at which a valve communicating with a radiator of the plurality of valves is opened.

The control method may further include activating the integrated coolant control valve to move the cam to a set position in accordance of the control of the controller if the controller determines that the position sensor is not faulty.

The set position may correspond to a section in which a radiator is maximally opened.

The step of determining whether the position sensor is faulty may include measuring a position of the cam using the position sensor, measuring a coolant temperature using a water temperature sensor and comparing, by the controller, the measured coolant temperature with the measured position of the cam to determine whether the position sensor is faulty.

The step of limiting the torque output of the engine may be performed with assuming that the measured position of the cam is the maximum position if the position sensor is faulty.

The step of limiting the torque output of the engine may be performed in accordance with the measured position of the cam according to the output signal of the position sensor if the position sensor is not faulty.

The step of limiting the torque output of the engine may be performed according to a preset map.

A vehicle provided with an integrated coolant control valve according to an embodiment of the present disclosure may include an integrated coolant control valve including a plurality of coolant passages for supplying coolant to a plurality of heat exchange elements having a radiator, a plurality of valves for selectively opening the plurality of coolant passages respectively, a cam on which a plurality tracks are formed for pushing the plurality of valves to be opened, respectively, and a motor selectively rotating the cam. The vehicle may include a vehicle operation state detecting portion that includes a coolant temperature sensor for measuring a coolant temperature and outputting a corresponding temperature signal, a position sensor for measuring a rotation position of the cam and outputting a corresponding position signal, and an accelerator pedal sensor measuring an operation angle of an accelerator pedal and outputting a corresponding angle signal. The vehicle may include an engine that includes an injector for injecting fuel. The vehicle may include a controller for controlling operations of the integrated coolant control valve and the injector according to the output signals of the vehicle operation state detecting portion. The controller may perform a fault diagnosis of the integrated coolant control valve, determine whether the position sensor is faulty when the controller determines that the integrated coolant control valve is faulty, and move the cam to a maximum position by operating the integrated coolant control valve when the controller determines that the position sensor is faulty.

The controller may activate the integrated coolant control valve to move the cam to a set position if the controller determines that the position sensor is not faulty.

The controller may stop the operation of the integrated coolant control valve after operating the integrated coolant control valve.

After stopping the operation of the integrated coolant control valve, the controller may restrict the operation of the injector by applying the current cam position and the output angle signal of the accelerator opening sensor to a set torque limit map.

The integrated coolant control valve and the control method for the same may prevent engine failure due to overheating when the integrated coolant control valve malfunctions or fails.

The following reference numbers and elements are noted in the drawings and throughout the written description.

| | |
|---|---|
| 10: vehicle operation state detecting portion | |
| 12: coolant temperature sensor | |
| 14: position sensor | 16: accelerator pedal sensor |
| 18: oil temperature sensor | 20: intake air temperature sensor |
| 22: vehicle speed sensor | 30: injector |
| 40: igniter | |
| 125: integrated coolant control valve | |
| 215a: first rod | 215b: second rod |
| 215c: third rod | 220a: first valve |
| 220b: second valve | 220c: third valve |
| 300: controller | 305: motor |
| 310: gear box | |

DETAILED DESCRIPTION OF THE EMBODIMENTS

Hereinafter, an embodiment of the present disclosure is described in detail with reference to the accompanying drawings.

In addition, parts that are irrelevant to the description are omitted to clearly describe the embodiments of the present disclosure. Also, like reference numerals designate like elements throughout the specification.

In the following description, dividing names of components into first, second, and the like is to divide the names because the names of the components are the same. An order thereof is not particularly limited where such divided names are applied.

Figure 1:
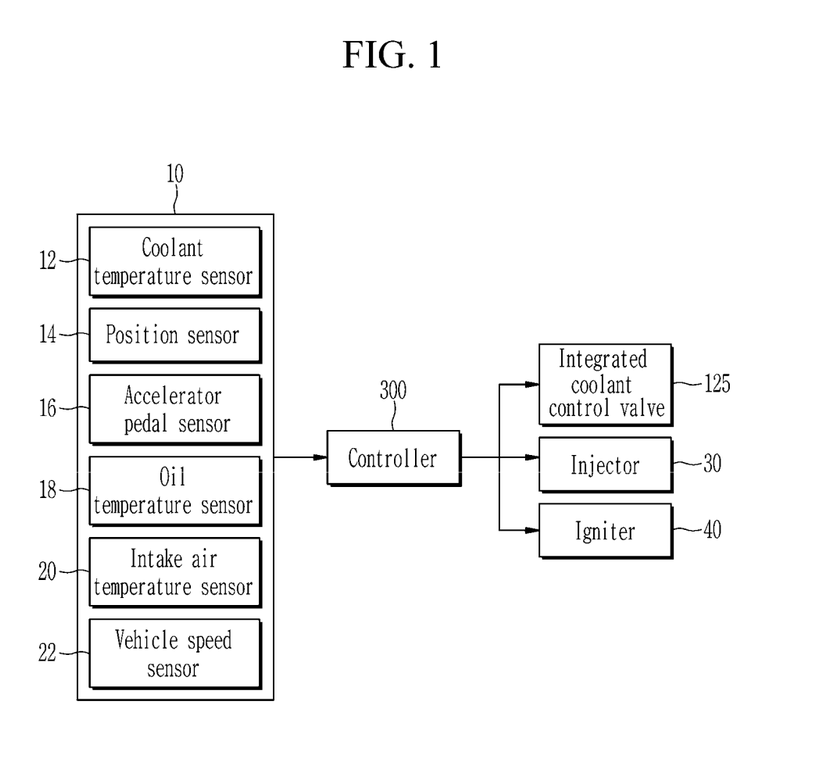
FIG. 1 is a block diagram of a control system applicable to a control method according to an embodiment of the present disclosure.
Figure 2:
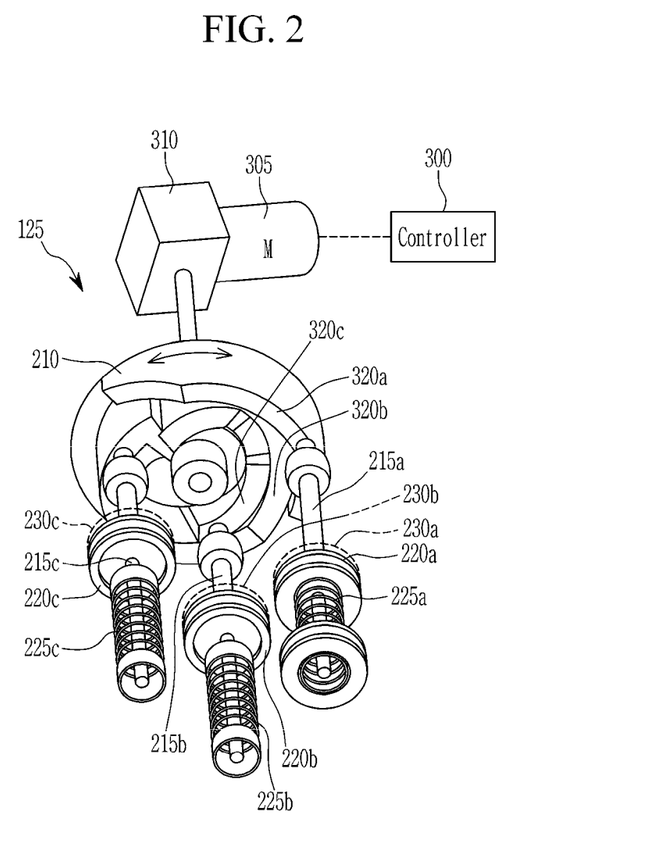
FIG. 2 is a partial exploded perspective view of an integrated coolant control valve applicable to a control method according to an embodiment of the present disclosure.

FIG. 1 is a block diagram of a control system applicable to a control method according to an embodiment of the present disclosure. FIG. 2 is a partial exploded perspective view of an integrated coolant control valve applicable to a control method according to an embodiment of the present disclosure.

Referring to FIGS. 1 and 2, a cooling system according to an embodiment of the present disclosure includes a controller 300 for controlling an integrated coolant control valve 125 and an injector 30 of an engine according to an output signal of a vehicle operation state detecting portion 10.

The vehicle operation state detecting portion 10 includes a coolant temperature sensor 12 for detecting a temperature of coolant and outputting a corresponding temperature signal. The vehicle operation state detecting portion 10 also includes a position sensor 14 and an accelerator pedal sensor 16 for detecting an operation angle of an accelerator pedal and outputting a corresponding angle signal. The vehicle operation state detecting portion 10 also includes an oil temperature sensor 18 for detecting engine oil temperature and outputting a corresponding oil temperature signal and an intake air temperature sensor 20 detecting intake air temperature and outputting a corresponding air temperature signal. The vehicle operation state detecting portion 10 also includes a vehicle speed sensor 22 for detecting a speed of a vehicle and outputting a corresponding speed signal.

The position sensor 14 detects a rotation position of a cam 210 describe later and outputs a corresponding position signal.

The controller 300 may be implemented as one or more microprocessors operating by a predetermined program. The predetermined program may include a series of commands for performing the embodiment of the present disclosure.

The controller 300 controls the operation of the integrated coolant control valve 125 and the injector 30 in a plurality of operation modes that are set in advance based on the vehicle operation information transmitted from the vehicle operation state detecting portion 10, Further, in the case where the engine is a gasoline engine, the engine may further include an igniter 40, and the controller 300 may control the operation of the igniter 40.

Referring to FIG. 2, the integrated coolant control valve 125 includes a cam 210, tracks formed on the cam 210, rods contacting the tracks, valves connected with the rods, and elastic members biasing the valves. The valves may close coolant passages.

A plurality of the tracks on the cam 210, for example, a first track 320a, a second track 320b, and a third track 320c, each have a predetermined inclination and height. A plurality of rods, for example, a first rod 215a, a second rod 215b, and a third rod 215c, are provided in a lower portion of the cam 210 such that the first, second, and third rods 215a, 215b, and 215c respectively contact the first, second, and third tracks 320a, 320b, and 320c and can move downward depending on a rotation position of the cam 210.

In addition, the elastic member includes, for example, three elastic members, i.e., a first elastic member 225a, a second elastic member 225b, and a third elastic member 225c to respectively elastically support the first, second, and third rods 215a, 215b, and 215c. In this case, opening rates of each passage 230a, 230b, and 230c are controlled according to the rotation position of the cam 210.

The controller 300 receives vehicle operation conditions, (e.g., a coolant temperature, an ambient air temperature, a rotation position signal of the position sensor 14 detecting the rotation position of the cam 210 and so on) and controls an operation of a motor 305. The motor 305 changes the rotation position of the cam 210 through a gear box 310.

The position sensor 14 may be a sensor that directly detects a rotation position of the cam 210. Alternatively, the controller 300 may indirectly calculate the rotation position of the cam 210 by detecting a rotation portion of the motor 305 through a resolver (not shown).

The first coolant path 230a, for example, is fluidly communicated with a radiator, the second coolant path 230b, for example, is fluidly communicated with heat exchange elements including an EGR cooler, and the third coolant path 230c, for example, is fluidly communicated with an engine block.

It should be understood that the integrated coolant control valve is not limited to the integrated coolant control valve shown in FIG. 2. The integrated coolant control valve may adopt any known structure of heat management modules capable of opening and closing at least three coolant passages.

Figure 3:
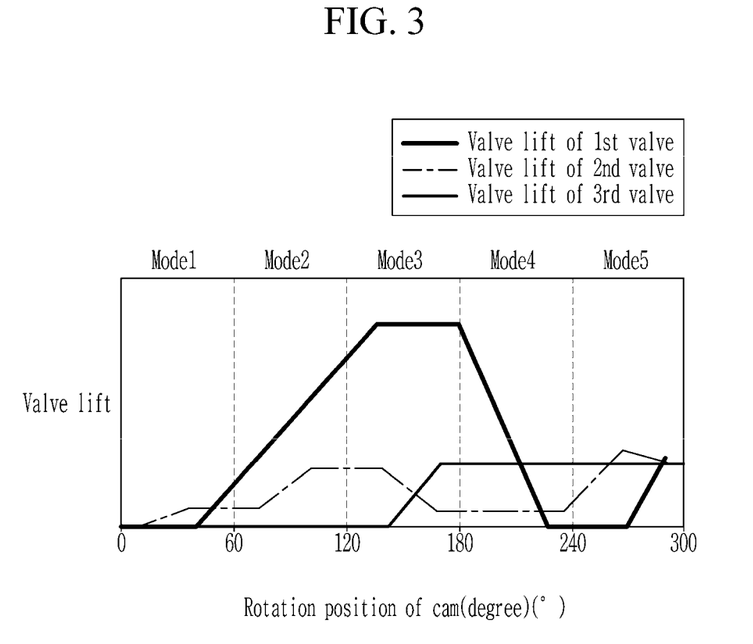
FIG. 3 is a graph showing operating modes of an integrated coolant control valve applicable to a control method according to an embodiment of the present disclosure.

FIG. 3 is a graph showing operating modes of an integrated coolant control valve applicable to a control method according to an embodiment of the present disclosure.

Referring to FIG. 3, each operating mode of the cooling system according to an embodiment of the present disclosure is described.

In FIG. 3, the horizontal axis denotes a rotation position of the cam 210. The vertical axis denotes valve lifts (or moving distance) of the respective valves 220a, 220b, and 220c.

The controller 300 controls the operation of the integrated coolant control valve 125 according to an output signal of the vehicle operation state detecting portion 10 so as to close or partially open the first, second, and third coolant passages 230a, 230b, and 230c. In this case, first and second modes of shutting off or partially opening of valves may be implemented to achieve appropriate warming or cooling of the cooling system during cooling or warm operation of the vehicle.

The controller 300 controls the operation of the integrated coolant control valve 125 according to an output signal of the vehicle operation state detecting portion 10 so that the first, second, and third cooling water or coolant passages 230a, 230b and 230c are opened. In this case, a third mode of opening all of the first, second, and third coolant passages 230a, 230b, and 230c may be implemented to achieve the maximum cooling of the cooling system during a high temperature driving condition the vehicle.

The controller 300 controls the operation of the integrated coolant control valve 125 according to an output signal of the vehicle operation state detecting portion 10 so that the opening rates of the first, second, and third cooling water or coolant passages 230a, 230b and 230c are controlled. In this case, a fourth mode or a fifth mode for controlling the amount or degree of opening rates of the first, second, and third coolant passages 230a, 230b, and 230c may be implemented.

The cooling system according to the embodiment of the present disclosure is not limited to the above-described five modes. Various modifications are possible according to the engine type, cooling water or coolant type, vehicle driving environment, and the like.

In the fifth mode, the first, second, and third coolant passages 230a, 230b, and 230c are all opened.

Figure 4:
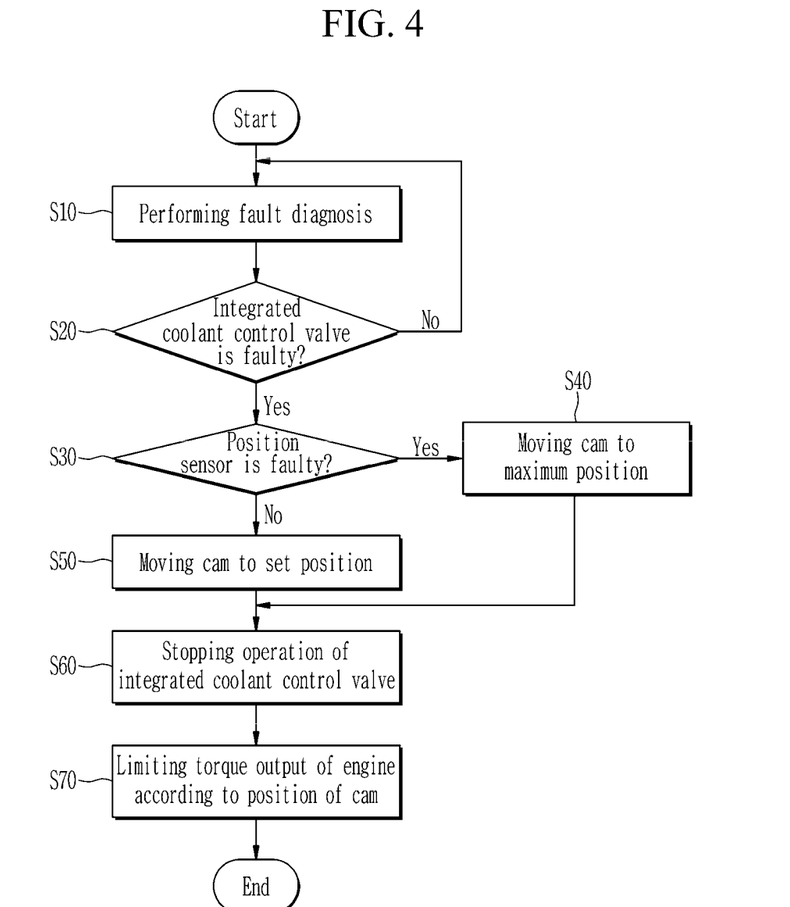
FIG. 4 is a flowchart of a control method according to an embodiment of the present disclosure for a vehicle provided with an integrated coolant control valve.
Figure 5:
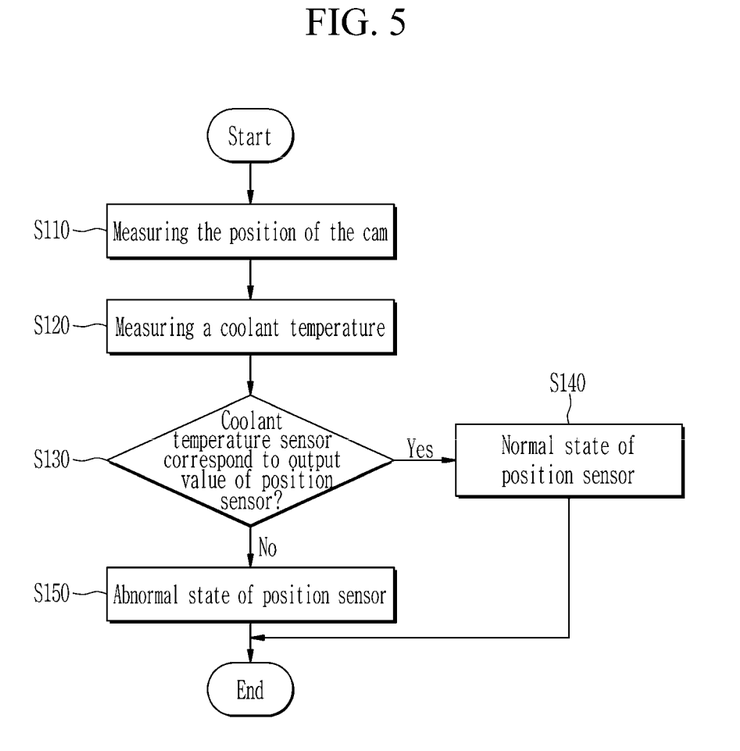
FIG. 5 is a flowchart of a fault diagnosis of an integrated coolant control valve applicable to a control method according to an embodiment of the present disclosure.

FIG. 4 is a flowchart of a control method according to an embodiment of the present disclosure for a vehicle provided with an integrated coolant control valve. FIG. 5 is a flowchart of a fault diagnosis of an integrated coolant control valve applicable to a control method according to an embodiment of the present disclosure.

Hereinafter, the control method of the vehicle equipped with the integrated coolant control valve according to the embodiments of the present disclosure is described with reference to FIGS. 4 and 5.

The controller 300 performs a fault diagnosis of the integrated coolant control valve 125 (S10). When the controller 300 determines that the integrated coolant control valve 125 is faulty (S20), the controller 300 determines whether the position sensor 14 is faulty. The position sensor 14 measures the position of the cam 210 and outputs the corresponding position signal or output signal (S30). When the controller 300 determines that the position sensor 14 is faulty in S30, the controller 300 controls the operation of the integrated coolant control valve 125 to move the cam 210 for opening and closing the plurality of valves 220a, 220b, and 220c to a maximum position (S40). Then, the controller 300 stops the operation of the integrated coolant control valve 125 (S60) and limits a torque output of an engine according to the position of the cam 210 (S70).

In this case, the fault diagnosis of the integrated coolant control valve 125 at S10 may be various types of failure diagnosis of the components of the integrated coolant control valve 125, such as the motor 305, the cam 210, the oil temperature sensor 18, and the controller 300. The specific method and the like should be known to those of ordinary skill in the art, and a detailed description thereof has been omitted.

The maximum position is a position at which a valve communicating with a radiator of the plurality of valves 220a, 220b, and 220c is opened.

In other words, referring to FIG. 3, the maximum position may be, for example, the rotation position of the cam 210 of about 300 degrees, and at this time, a valve may be opened that is communicating with a plurality of heat exchange elements including at least a radiator.

In case of failure of the position sensor 14, since the exact position of the cam 210 may not be known, the cam 210 is moved to the maximum position so that minimum cooling may be performed.

The maximum position is the maximum position at which the cam 210 may move and the controller 300 supplies power to the motor 305 to rotate the cam 210 to the maximum position. In the drawing, the maximum position is about 300 degrees, but the present disclosure is not limited thereto.

Referring to FIG. 5, the step of determining whether the position sensor 14 is faulty includes measuring the position of the cam 210 using the position sensor 14 (S110), measuring a coolant temperature using the coolant temperature sensor 12 (S120) and comparing, by the controller 300, the measured coolant temperature with the measured position of the cam, i.e., the sensor 14 output value, to determine whether the position sensor 14 is faulty (S130).

For example, the controller 300 may compare information of a standard map that includes the position of the cam 210 and the coolant temperature with the output of the coolant temperature sensor 12, i.e., the temperature signal, and the output of the position sensor 14, i.e., the position signal, to determine whether the position sensor 14 is malfunctioning.

The controller 300 determines that the position sensor 14 is in a normal state (S140) if the output value of the coolant temperature sensor 12 corresponds to the output value of the position sensor 14 compared to the standard map. The controller 300 determines that the position sensor 14 is in abnormal state (S140) if the output value of the coolant temperature sensor 12 does not correspond to the output value of the position sensor 14 (S150) compared to the standard map.

Referring to FIG. 4, the controller 300 activates the integrated coolant control valve 125 to move the cam 210 to a set position if the controller 300 determines that the position sensor 14 is not faulty (S50).

The set position corresponds to a section in which the radiator is maximally opened.

For example, referring to FIG. 3, the set position may correspond to the third mode. That is, when the integrated coolant control valve 125 is faulty and the position sensor 14 is in the normal state, the valve that communicates with the radiator is maximally opened, thereby preventing the engine from overheating.

The controller 300 stops the operation of the integrated coolant control valve 125 (S60) after moving the cam 210 to the maximum position (S40) or moving the cam 210 to the set position (S50). For example, the power source for operating the integrated coolant control valve 125 is shut off in accordance of the control of the controller 300.

The step of limiting the torque output of the engine (S70) may be performed with assuming that the position of the cam 210 is the maximum position if the position sensor 14 is faulty. That is, as described above, when the position sensor 14 is faulty, the cam 210 is assumed to be at the maximum position. The operation of the engine is controlled so that the engine is not overheated. For example, the controller 300 controls the fuel injection amount of the injector 30 by applying the output signals of the accelerator pedal sensor 16 and the vehicle speed sensor 22 to a preset restriction map. In the case of a gasoline engine, the controller 300 also controls the operation of the igniter (40). The restriction map for restricting the torque output of the engine may be preset by experiment as a map for preventing engine overheating.

The step of limiting the torque output of the engine (S70) may be performed in accordance with the position of the cam 210 according to the output signal of the position sensor 14 if the position sensor 14 is not faulty. If the position sensor 14 is not faulty, the position of the cam 210 is known. Thus, the controller 300 controls the fuel injection amount of the injector 30 by applying the position of the cam 210, the accelerator opening sensor 16, and the vehicle speed sensor 22 to the restriction map for preventing engine overheating.

While this disclosure has been described in connection with what is presently considered to be practical embodiments, it is to be understood that the disclosure is not limited to the disclosed embodiments. To the contrary, the disclosure is intended to cover various modifications and equivalent arrangements included within the spirit and scope of the appended claims.

What is claimed is:

1. A control method for a vehicle provided with an integrated coolant control valve, the control method comprising:
    performing, by a controller, a fault diagnosis of the integrated coolant control valve;
    determining, by the controller, whether a position sensor is faulty, the position sensor measuring a position of a cam and outputting a corresponding output signal when the controller determines that the integrated coolant control valve is faulty;
    moving the cam for opening and closing a plurality of valves to a maximum position by operating the integrated coolant control valve when the controller determines that the position sensor is faulty;
    stopping the operation of the integrated coolant control valve by the controller; and
    limiting a torque output of an engine by the control of the controller according to the measured position of the cam.

2. The control method of claim 1, wherein the maximum position is a position at which a valve, communicating with a radiator, of the plurality of valves is opened.

3. The control method of claim 1, further comprising:
    activating the integrated coolant control valve to move the cam to a set position in accordance of the control of the controller if the controller determines that the position sensor is not faulty.

4. The control method of claim 3, wherein the set position corresponds to a section in which a radiator is maximally opened.

5. The control method of claim 1, wherein the step of determining whether the position sensor is faulty comprises:
    measuring a position of the cam using the position sensor;
    measuring a coolant temperature using a water temperature sensor; and
    comparing, by the controller, the measured coolant temperature with the measured position of the cam to determine whether the position sensor is faulty.

6. The control method of claim 1, wherein:
    the step of limiting the torque output of the engine is performed with an assumption that the position of the cam is the maximum position if the position sensor is faulty.

7. The control method of claim 1, wherein:
    the step of limiting the torque output of the engine is performed in accordance with the position of the cam according to the output signal of the position sensor if the position sensor is not faulty.

8. The control method of claim 1, wherein:
    the step of limiting the torque output of the engine is performed according to a preset map.

* * * * *